INVENTORS
ROBERT E. SMITH
HERMAN B. URBACH

United States Patent Office 3,575,835
Patented Apr. 20, 1971

3,575,835
HYDRAZINE SENSOR
Robert E. Smith and Herman B. Urbach, Annapolis, Md., assignors to the United States of America as represented by the Secretary of the Navy
Filed Oct. 28, 1968, Ser. No. 771,086
Int. Cl. G01n 27/46
U.S. Cl. 204—195                                        7 Claims

ABSTRACT OF THE DISCLOSURE

A sensing cell for determining the fuel content of an electrolyte for a fuel cell, which is constructed to be mounted as a section in the feed conduit of the fuel cell. It is constructed with the cathode as a portion of one wall of the conduit and with a larger-pore membrane as another part of the conduit wall. Mounted outside the conduit and adjacent the membrane is a porous anode which is enclosed in a chamber having attached thereto a return conduit to carry the electrolyte which passes through the membrane and the anode back to the electrolyte reservoir. The chamber is not filled with fluid but provides a space to receive the gas generated in the sensor cell, which gas then passes out through the run-off pipe. The system may be open or closed depending upon the specific application.

The invention described herein may be manufactured and used by or for the Government of the United States of America for governmental purposes without the payment of any royalties thereon or therefor.

SUMMARY AND BACKGROUND

In the field of fuel cells and their control there is need for a sensor to determine the amount of fuel, such as hydrazine, present in the electrolyte. The output of such a sensor is useful in the regulation of a fuel cell to provide a stable output for the system.

In prior sensors of this type the generated electrical signal was found to contain a very large percentage of electrical "noise" such that the accuracy of the measurement was degraded. In these prior sensors this "noise" was found to be produced by such things as fluctauation resulting from pumping of the electrolyte through the sensor, stoppages in capillaries, bubble evolution on electrodes, etc.

The present invention is an improvement over the prior art sensors including sensors disclosed in co-pending application, Patent Office Ser. No. 760,049, filed Sept. 10, 1968, and is constructed to avoid or minimize the effects of these sources of "noise."

It is an object of the present invention to provide an improved hydrazine sensing cell.

Another object of this invention is to provide a hydrazine sensing cell having a low electrical noise output.

A further object of this invention is to provide a hydrazine sensing cell having an easily maintained structure.

Other objects and features of the invention will hereinafter become more fully apparent from the following description and the annexed drawings which illustrate a preferred embodiment of the invention wherein:

DETAILED DESCRIPTION OF THE INVENTION

Figure 1:
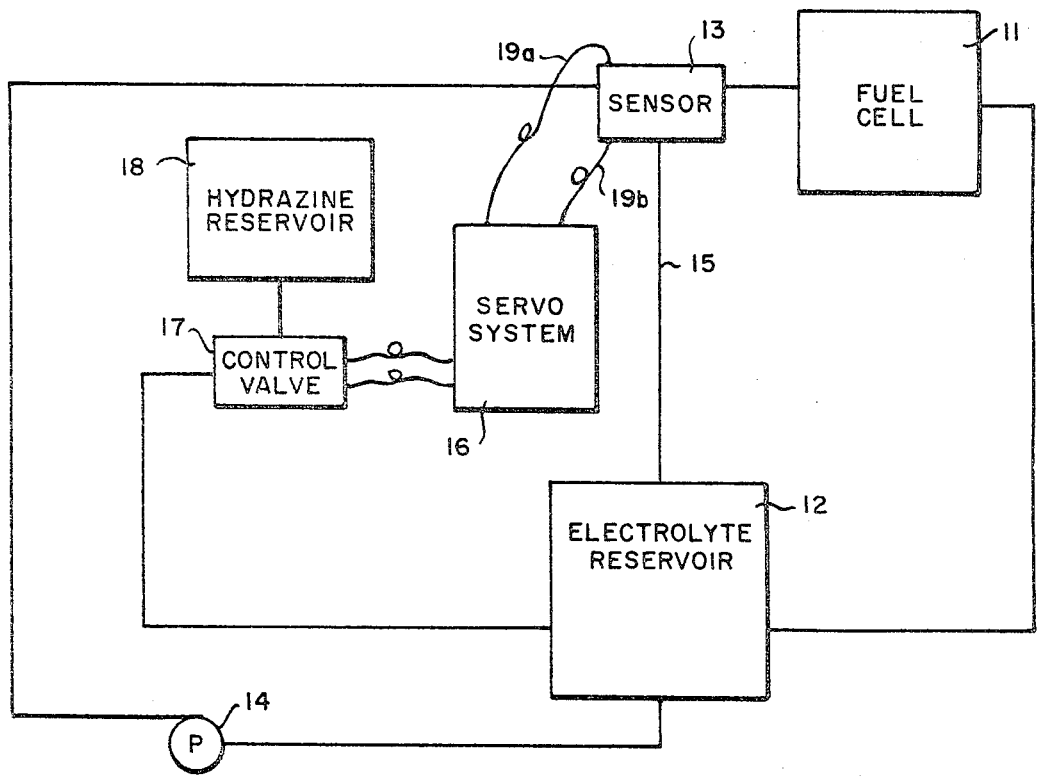
FIG. 1 is a diagrammatic view of the system employing the invention.

Referring now to the drawings, wherein like reference characters designate like or corresponding parts, there is shown in FIG. 1 a system embodying the present invention. The system shown comprises a fuel cell 11 having an electrolyte containing a hydrazine fuel, which electrolyte is moved from an electrolyte reservoir 12 through the hydrazine sensor 13 of this invention to the fuel cell 11 by a pump 14. The sensor 13 has a return or run-off pipe 15 to return the electrolyte used by the sensor to the electrolyte reservoir 12, though in some applications the return may be omitted and the electrolyte passing through the sensor allowed to escape to the atmosphere. The sensor 13 produces an electrical signal proportional to the hydrazine content of the electrolyte flowing through it, which signal may be passed through connectors 19a and 19b to actuate a servo system 16 which in turn operates a control valve 17. The control valve 17 controls the flow of hydrazine from the hydrazine storage reservoir 18 to the electrolyte reservoir 12 for mixing the electrolyte.

Figure 2:
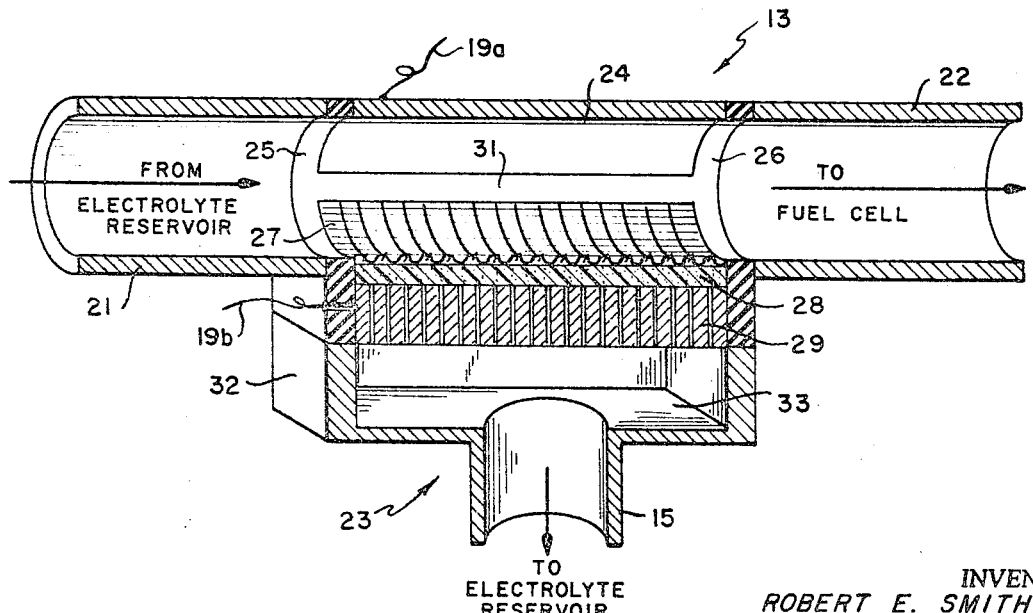
FIG. 2 is a sectional view of the sensor cell of this invention.

Referring now to FIG. 2, the hydrazine sensor of this invention is constructed to be mounted in the feed line to the fuel cell, as shown in FIG. 1, and comprises two sections of pipe 21 and 22 for attachment in the feed line of the fuel cell. Mounted between and connected to pipes 21 and 22 is a sensor section 23 which comprises a cathode section 24 forming a continuation of a portion of the pipe walls of pipes 21 and 22 and which may be electrically insulated therefrom by portions of insulation members 25 and 26 or the cathode may be grounded. The cathode may be mounted within the section 23 as a lining for a portion of the fuel line. Another portion of the sensor section in continuation of the walls of pipes 21 and 22 consists of a retaining screen 27 which overlies and holds in place a porous convection membrane 28. Screen 27 and membrane 28 overlie and separate a porous anode 29 from the interior of that portion of the sensor cell which forms a continuation of pipes 21 and 22. The anode 29 is electrically insulated from the cathode by insulating members 25 and 26 and a portion of insulating material 31 joining them. Attached to and forming a chamber 33 with insulating members 25 and 26 is a member 32. Chamber member 32 has attached thereto a run-off or return pipe 15.

OPERATION

In operation the electrolyte flows through the sensor 13 on its way to the fuel cell as shown in FIG. 1 and a small amount passes through the screen 27 and membrane 28 to flow through porous anode 29 into chamber 33 from which it returns to the electrolyte reservoir 12 by way of pipe 15. The rate of flow is regulated by the selection of the pore size of the convection membrane 28 and of the pore size through the anode 29. This rate is selected to provide a small but steady flow through the anode. However, this flow is not great enough to fill the chamber 33. In a preferred embodiment of the system, the return from chamber 33 to the electrolyte reservoir is by gravity through pipe 15. This constant flow through the anode 29 into the open space within the chamber 33 allows the gases generated in the Faradic combustion of the hydrazine to escape from the electrode and prevents the occlusion of bubbles to the electrode. Also, since the quantity of electrolyte passing through the sensor anode is small compared to the principal flow through the sensor to the fuel cell and since the membrane 28 tends to damp them out the fluctuations in the flow do not appreciably affect the sensor output. Therefore, it becomes apparent that the hydrazine sensor of this invention produces an output having a reduced "noise" content and will permit a more accurate control of a fuel cell with which it may be used.

What is claimed is:

1. A hydrazine sensor for use in a fuel line system for a fuel cell comprising:
   a fuel line having first and second wall portions;
   an imperforate cathode means forming the first portion of the fuel line wall in said sensor;
   porous anode means forming the second portion of the fuel line wall whereby a portion of the fuel may be passed from the fuel line through said anode;
   said anode means including a porous membrane, said membrane being positioned intermediate said anode and the interior of said fuel line;
   insulating means for electrically insulating said cathode from said anode;
   a first means connected to said anode means for disposing of the electrolyte which passes through said anode means; and
   said sensor in operation producing an electrical signal proportional to the hydrazine content of the electrolyte.

2. A device as claimed in claim 1 in which said cathode means is electrically grounded to said fuel line.

3. A device as claimed in claim 2 in which said anode means includes a retaining screen mounted to maintain said porous membrane in place.

4. A device as claimed in claim 2 in which said first means is a chamber which is a vented chamber.

5. A device as claimed in claim 1 in which said first means is a chamber having a closed return to the fuel system of the fuel cell.

6. A device as claimed in claim 1 in which said cathode means is mounted to lie within and conform to a portion of the fuel line.

7. A device as claimed in claim 1 in which said first means is a chamber.

References Cited

UNITED STATES PATENTS

| | | | |
|---|---|---|---|
| 2,870,078 | 1/1959 | Hood | 204—195 |
| 2,921,110 | 1/1960 | Crowley et al. | 136—86 |
| 3,281,274 | 10/1966 | Moerikofer | 136—86 |
| 3,297,484 | 1/1967 | Niedrach | 136—86 |
| 3,462,307 | 8/1969 | Voorhies et al. | 136—86 |
| 3,234,562 | 2/1966 | Bell et al. | 136—86UX |

OTHER REFERENCES

Chaude, Bull. Soc. Chem., France, December 1961, pp. 2247 and 2451.

ALLEN B. CURTIS, Primary Examiner